United States Patent
Eu (12)
(10) Patent No.: US 6,222,656 B1
(45) Date of Patent: Apr. 24, 2001

(54) FIBER OPTICS SIGNAL ATTENUATOR

(75) Inventor: James K. Eu, Fremont, CA (US)

(73) Assignee: Axon Photonics, Inc., Fremont, CA (US)

( * ) Notice: Subject to any disclaimer, the term of this patent is extended or adjusted under 35 U.S.C. 154(b) by 0 days.

(21) Appl. No.: 09/044,694

(22) Filed: Mar. 18, 1998

(51) Int. Cl.⁷ .................................................. G02B 26/02
(52) U.S. Cl. .......................... 359/127; 359/227; 385/19; 385/33; 385/140
(58) Field of Search .................................. 359/230, 233, 359/236, 227; 385/140, 33, 23, 52

(56) References Cited

U.S. PATENT DOCUMENTS

| | | | | |
|---|---|---|---|---|
| 4,591,231 | * | 5/1986 | Kaiser et al. | 350/96.18 |
| 4,697,869 | * | 10/1987 | So et al. | 350/96.15 |
| 4,989,938 | * | 2/1991 | Tamulevich | 350/96.15 |
| 5,513,286 | * | 4/1996 | Easley | 385/19 |
| 5,642,456 | * | 6/1997 | Baker et al. | 385/140 |
| 5,790,289 | * | 8/1998 | Taga et al. | 359/124 |
| 5,877,879 | * | 3/1999 | Naito | 359/133 |
| 5,930,441 | * | 7/1999 | Betts et al. | 385/140 |

\* cited by examiner

*Primary Examiner*—Leslie Pascal
*Assistant Examiner*—Dalzid Singh
(74) *Attorney, Agent, or Firm*—Skjerven Morrill MacPherson LLP; Brian D. Ogonwsky (57) ABSTRACT

An attenuator for use in a wavelength division multiplexer (WDM) uses an opaque knife-edge as a light attenuator. The attenuator is moved along a single axis for controllably blocking the light output of an optical fiber whose light output is to be attenuated. By selectively moving the edge of the attenuator in front of the optical fiber, the attenuator can block any amount of the light output. Multiple attenuators are incorporated in a WDM, each attenuator being used in a channel associated with a particular narrow band of wavelengths.

12 Claims, 7 Drawing Sheets

FIBER OPTICS SIGNAL ATTENUATOR

FIELD OF THE INVENTION

This invention relates to fiber optics communications and, in particular, to an attenuator for optical signals in an optical fiber.

BACKGROUND

The relatively wide bandwidth of light that may be transmitted through a conventional optical fiber enables multiple light signals, each at a different wavelength, to be multiplexed and transmitted simultaneously over the same optical fiber. Such a technique is called wavelength division multiplexing (WDM). It is common for a single optical fiber to simultaneously transmit 16 or more multiplexed channels for any form of communication, including telephone communications and cable television.

In WDM, the signals (either electrical or optical) to be conveyed on each channel are converted into light signals within a narrow band of wavelengths (e.g., 2 nanometers) associated with a particular channel. A 16 channel WDM would use a total bandwidth of about 32 nanometers. A common center wavelength is on the order of 1500–1600 nanometers.

Converting an electrical or optical signal into a particular narrow band of wavelengths is well known. For example, an electrical signal may be applied to a particular type of laser diode which generates wavelengths within a particular bandwidth. Other techniques may include converting the electrical signal into a light signal and eliminating unwanted wavelengths. Some devices for extracting a specific narrow band of wavelengths from an optical signal include: 1) a tuned waveguide; 2) a diffraction grading; 3) a taper filter; and 4) other types of filters, such as a coated silica substrate where certain wavelengths are refracted and other wavelengths are reflected.

Figure 1:
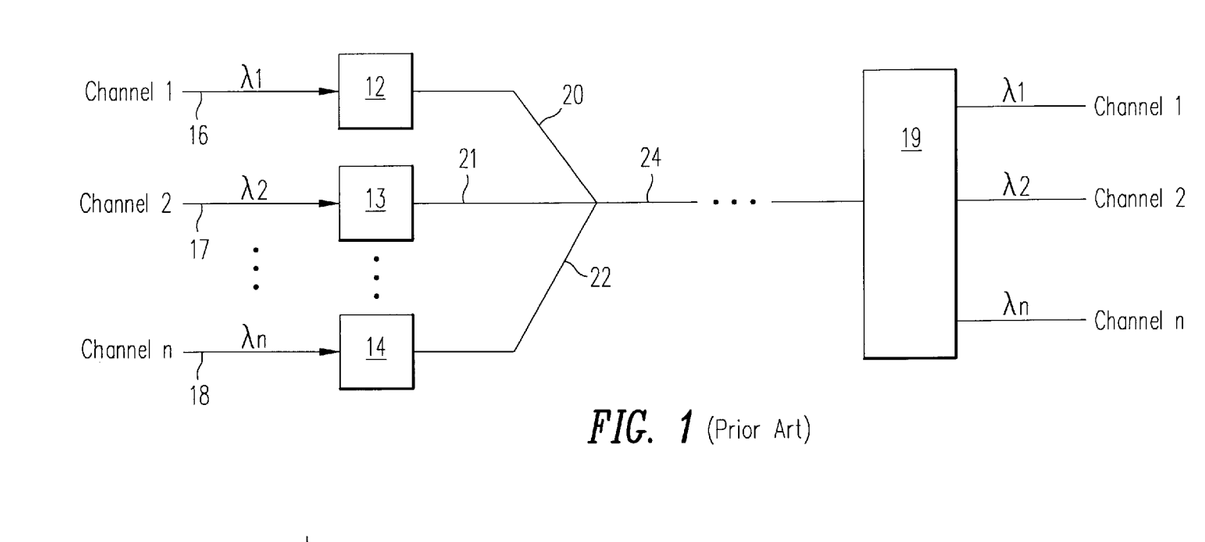
FIG. 1 illustrates a prior art wavelength division multiplexing and demultiplexing system.

The process of causing the optical signals to be within a particular narrow bandwidth also typically causes the optical intensities to differ for each channel. As a result, after the optical signals for the channels have been limited to their respective optical bandwidths, such as shown in FIG. 1, each of these optical signals must be attenuated so that the light intensity transmitted is equal for each channel and is of a predetermined level. This is so that the transmission performance for each channel is predictable. Such attenuators for each of the three channels (1, 2, and n) shown in FIG. 1 include attenuators 12, 13, and 14 for attenuating the optical signals in optical fibers 16, 17, and 18, respectively. Similar attenuators reside in a demultiplexer 19.

Figure 2:
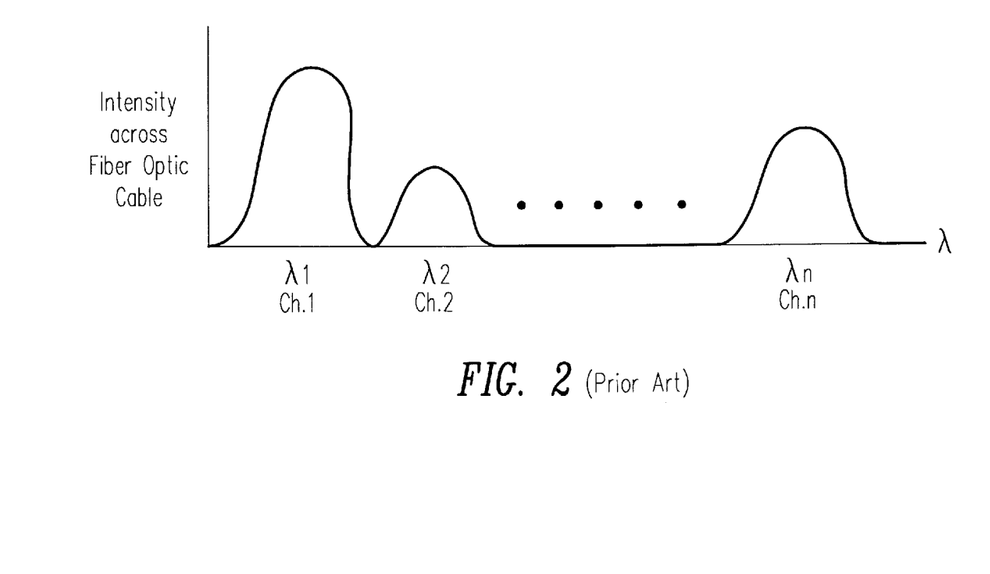
FIG. 2 illustrates the level of intensity of the optical signals in each of the three channels of FIG. 1 prior to attenuation.

FIG. 2 illustrates the intensity levels of the optical signals in each of the three channels, each optical signal being within a different narrow bandwidth of light. As seen, the intensity of the optical signal in channel 1 prior to attenuation is greater than that of the optical signals in channels 2 and 3, and the optical signal in channel 3 is greater than the intensity of the optical signal in channel 2. Attenuators 12, 13, and 14 serve to equalize the intensity levels of the three channels by selectively lowering the overall intensity of the higher intensity signals to equal that of the lowest intensity signal. One such attenuator will be discussed later with respect to FIGS. 3, 4A, and 4B.

The light outputs from the attenuators 12–14 are then applied to optical fibers 20, 21, and 22 and combined into a single optical fiber 24 so as to multiplex the n channels onto a single optical fiber. Hence, the device of FIG. 1 acts as a multiplexer to simultaneously transmit multiple channels, each at a different light bandwidth, along the same optical fiber. Additional multiplexers may be employed to multiplex additional channels on other optical fibers. The optical fibers may then be bundled in a cable for transmitting many optical signals.

Ultimately, the signals on the optical fiber 24 are demultiplexed by a demultiplexer 19 to separate out the various wavelengths of light into separate channels using well known means. These separate channels are then attenuated to have equal, predetermined intensities and converted into electrical signals, if required, for various applications such as by using photodetectors. Such demultiplexers include detraction gratings and filters which may be tuned to transmit a narrow range of predetermined wavelengths.

The attenuation levels in the multiplexer and demultiplexer may be determined empirically.

Figure 3:
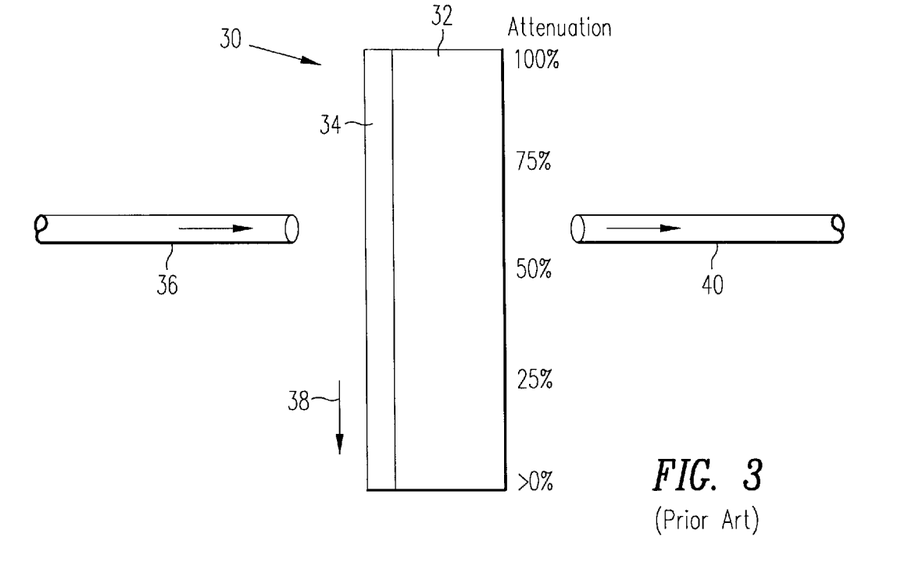
FIG. 3 illustrates the use of a neutral density filter as an attenuator in the device of FIG. 1.

One popular prior art technique for attenuating the intensity of a light output within a narrow band of wavelengths uses a neutral density filter for each of the wavelength bands of interest. Such a filter removes a selected amount of light depending on where the light impinges upon the filter. FIG. 3 illustrates a neutral density filter 30 composed of a silica substrate 32 with a coating 34 composed of material for progressively absorbing the light output of a fiber optic cable 36 as filter 30 is moved in the direction of arrow 38. The percentage of absorption of light output from cable 36 with respect to each area of filter 30 is identified in FIG. 3. The light exiting filter 30 is received by a fiber optic cable 40. It would be understood that additional optics, such as collimators, may be used at the ends of the fiber optic cables 36 and 40 to cause the light between the two cables to be collimated.

The filter 30 is adjusted in the direction of arrow 38 using a micrometer to select the desired amount of attenuation.

Figure 4A:
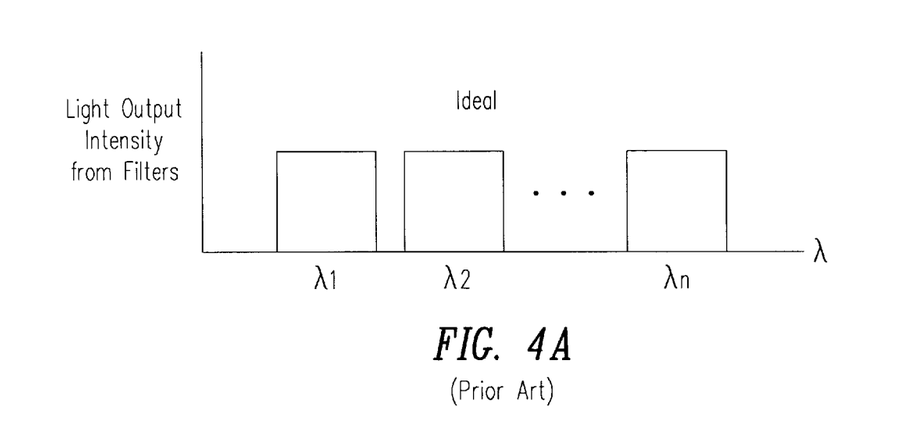
FIGS. 4A and 4B illustrate the ideal and actual light outputs, respectively, for various wavelength bands from the neutral density filter of FIG. 3.
Figure 4B:
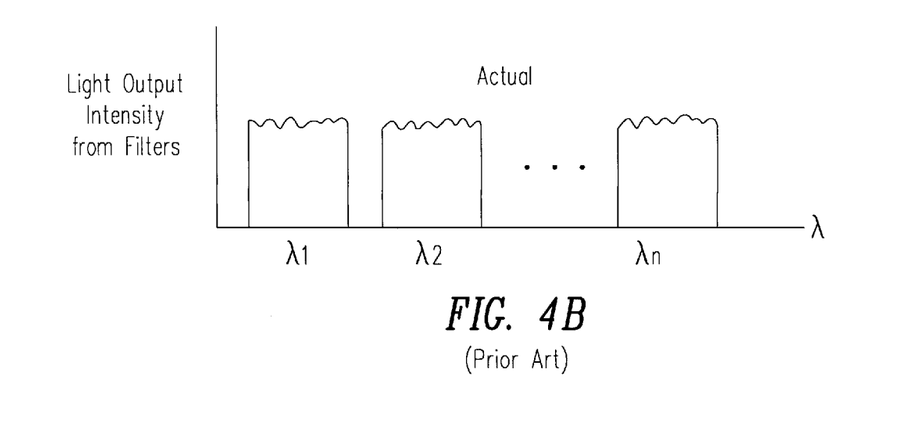

FIG. 4A illustrates the ideal light energy versus time for a number of pulses of the attenuated light received by fiber optic cable 40. In reality, however, this light signal contains ripples and other distortions, as shown in FIG. 4B, due to reflections at the interface of filter 30 causing constructive and destructive interference. Further, an inherent property of the silica 32 and the coating 34 is that there is always some attenuation even at the minimum attenuation level of filter 30.

What is needed is a light attenuator for a WDM system which is inexpensive, reliable, and does not suffer from the performance drawbacks of the prior art attenuators.

SUMMARY

In one embodiment, an attenuator for use in a wavelength division multiplexer (WDM) uses an opaque (e.g., metal) wedge-shaped device, referred to as a knife-edge, having a substantially triangular face which controllably blocks the light output of an optical fiber whose light output is to be attenuated. By selectively moving the knife-edge of the triangular face in front of the optical fiber, the attenuator can block any amount of the light output. The position of the attenuator in one embodiment is adjusted by means of a fine screw (e.g., a micrometer) which acts as a potentiometer control.

The use of such an attenuator instead of a neutral density filter includes the advantages of: 1) no noise (ripple) due to reflections and interference; 2) no residual attenuation so that the attenuation can be zero; 3) a wide dynamic range (0%–100%); 4) high stability; and 5) compact size.

A preferred embodiment attenuator includes a wedge-shaped knife-edge attenuator where the substantially triangular face has a beveled light blocking portion so as not to be directly orthogonal to the light output. Any reflections of light from the beveled portion do not reflect back into the impinging light so as to avoid any interference between the impinging and reflected light.

To minimize reflections, the knife-edge attenuator is essentially a black color, such as anodized aluminum.

DETAILED DESCRIPTION OF THE EMBODIMENTS

Figure 5:
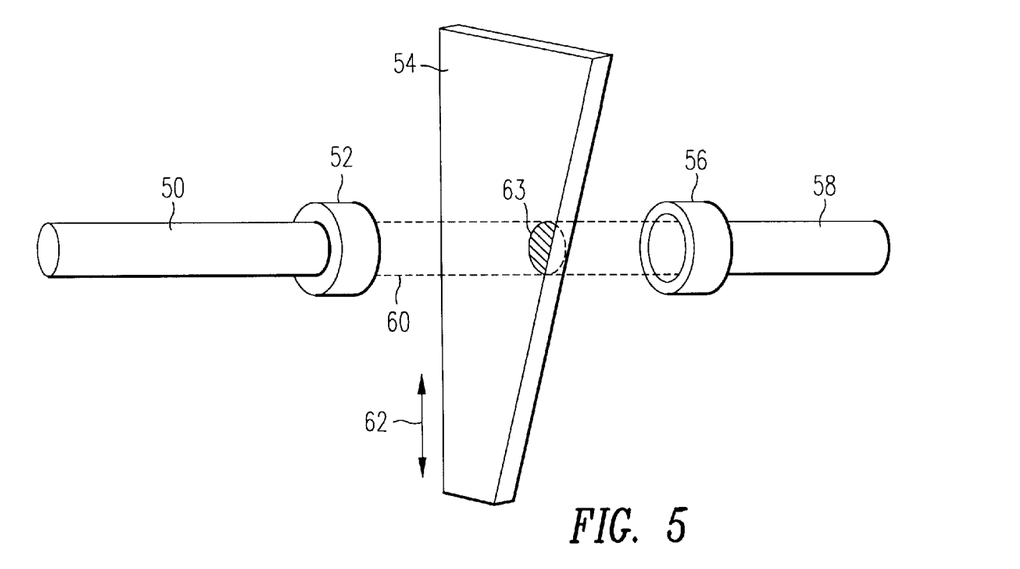
FIG. 5 illustrates the wedge-shaped attenuator variably inserted in the path of an optical beam between an output optical fiber and an input optical fiber.

FIG. 5 illustrates an attenuation system which includes a transmitting optical fiber 50, a collimator 52 for collimating the light output of fiber 50, a wedge-shaped movable attenuator 54 (also referred to as a knife-edge), a receiving collimator 56, and a receiving optical fiber 58. Optical fibers 50 and 58 are conventional as are collimators 52 and 56. Collimators 52 and 56 may be any commercial collimator. Collimators may be in the form of a single lens, a compound lens, or a gradient index (GRIN) lens. Such lenses are well known and described in Optics Guide 5, 1990, by Melles Griot Inc., incorporated by reference. Collimator 52 collimates the light output from fiber 50, as shown in the dashed-line light output 60 of collimator 52. Without collimator 52, the light output from fiber 50 would scatter and diffuse.

Attenuator 54 is formed of a material which is opaque to the wavelength of interest. In one embodiment, attenuator 54 is aluminum or any other metal and is anodized so as to be black to reflect very little of the impinging light from collimator 52. In one embodiment, the length of attenuator 54 is on the order of 8 mm. Attenuator 54 may have any shape which allows an edge to be selectively positioned in the optical path to attenuate the light.

Attenuator 54 is moved in the direction of arrow 62, in this case up or down, so as to block a selected amount (shown as shaded portion 63) of the light output 60 of collimator 52 to achieve the desired attenuation. The light that is not blocked procedes to the input of collimator 56, which focuses the light into the receiving fiber 58. The light from fiber 58 may then be combined with the attenuated light from other channels, such as shown in FIG. 1, so as to multiplex the various signals at different wavelengths onto a single fiber for long distance transmission.

Figure 6:
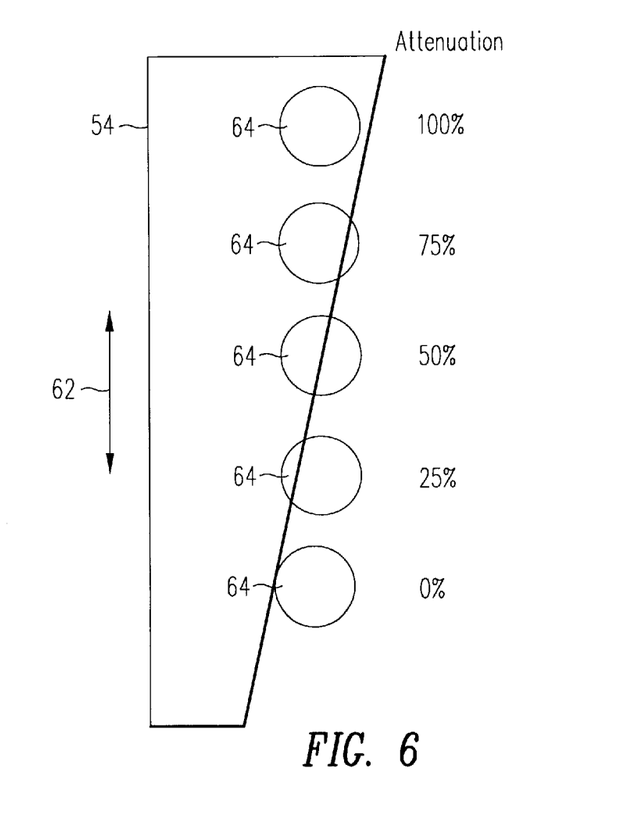
FIG. 6 illustrates the impinging light beam on the attenuator of FIG. 5 as the attenuator is moved along the direction of the arrow.

FIG. 6 illustrates attenuator 54 from FIG. 5 at different positions relative to a fixed impinging light spot 64 to achieve various attenuations identified in FIG. 6.

Although the black surface of attenuator 54 reflects little of the impinging light, any reflection back into the impinging light could cause interference and distort the signal. The shape of the knife-edge attenuator 66 of FIG. 7A eliminates such reflection into the impinging light. This is achieved by providing attenuator 66 with a beveled surface portion 68 on which the light output of collimator 52 (FIG. 5) impinges.

Figure 7A:
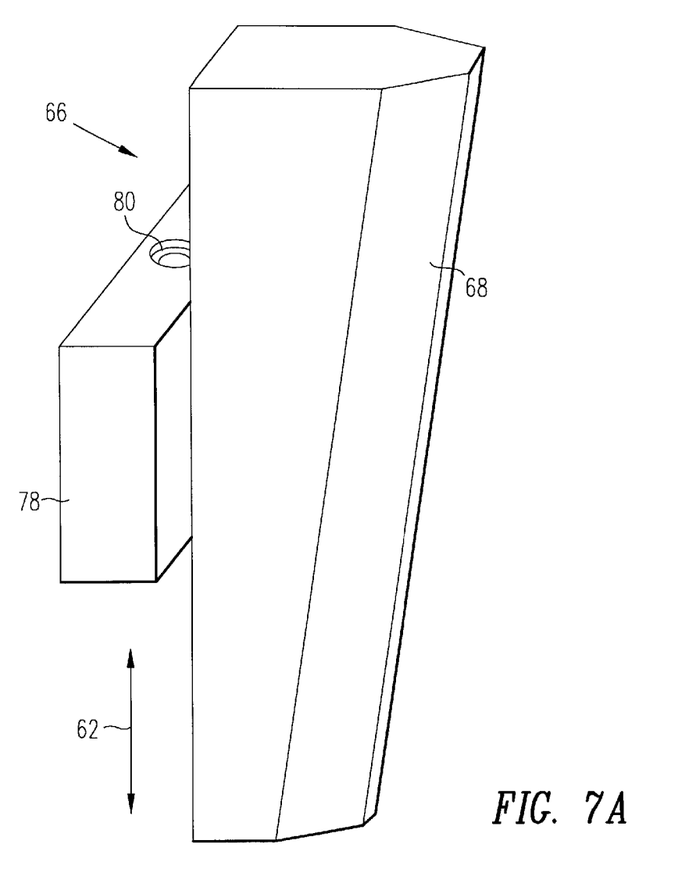
FIG. 7A illustrates a preferred embodiment of the attenuator having a beveled edge for selectively blocking light from a light source to minimize reflections back into the impinging beam.
Figure 7B:
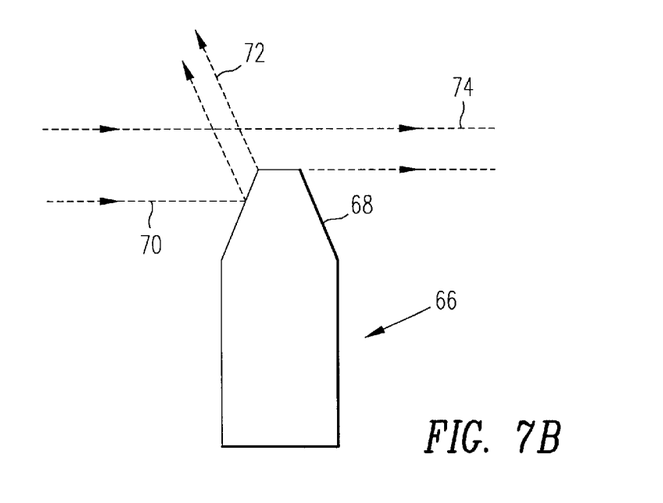
FIG. 7B is a top down view of the attenuator of FIG. 7A illustrating the reflection of light from the beveled edge.

FIG. 7B shows a top down view of the attenuator 66 and illustrates an impinging light beam 70 having a portion 72 reflected away from the impinging light beam and a second portion 74 passing attenuator 66 for receipt by a receiving optical fiber.

In one embodiment, the length of attenuator 66 is 8 mm, the width at the large end of attenuator 66 is 3.2 mm, the width at the narrow end of attenuator 66 is 1.5 mm, the width of the beveled portion 68 is 1 mm, the thickness of the non-beveled portion is 0.7 mm, and the angle of the beveled portion with respect to the flat surface of attenuator 66 is 8°. Other sizes and angles would also suffice. For example, the bevel angle can be anywhere from 1° to in excess of 45° while still providing the benefits of the bevel.

In one embodiment, the means for shifting attenuator 66 up and down in the direction of arrow 62 includes a block 78 adhesively fixed to a surface of attenuator 66, where block 78 includes a threaded screw hole 80 through which an adjustment screw is inserted (forming a micrometer). As the screw is turned, attenuator 66 is moved up and down relative to the screw to control the attenuation. Block 78 may have a height of 3 mm and a width a little larger than the width of attenuator 66 to act as a guide (illustrated in FIG. 9) to limit rotational movement of attenuator 66.

Figure 8:
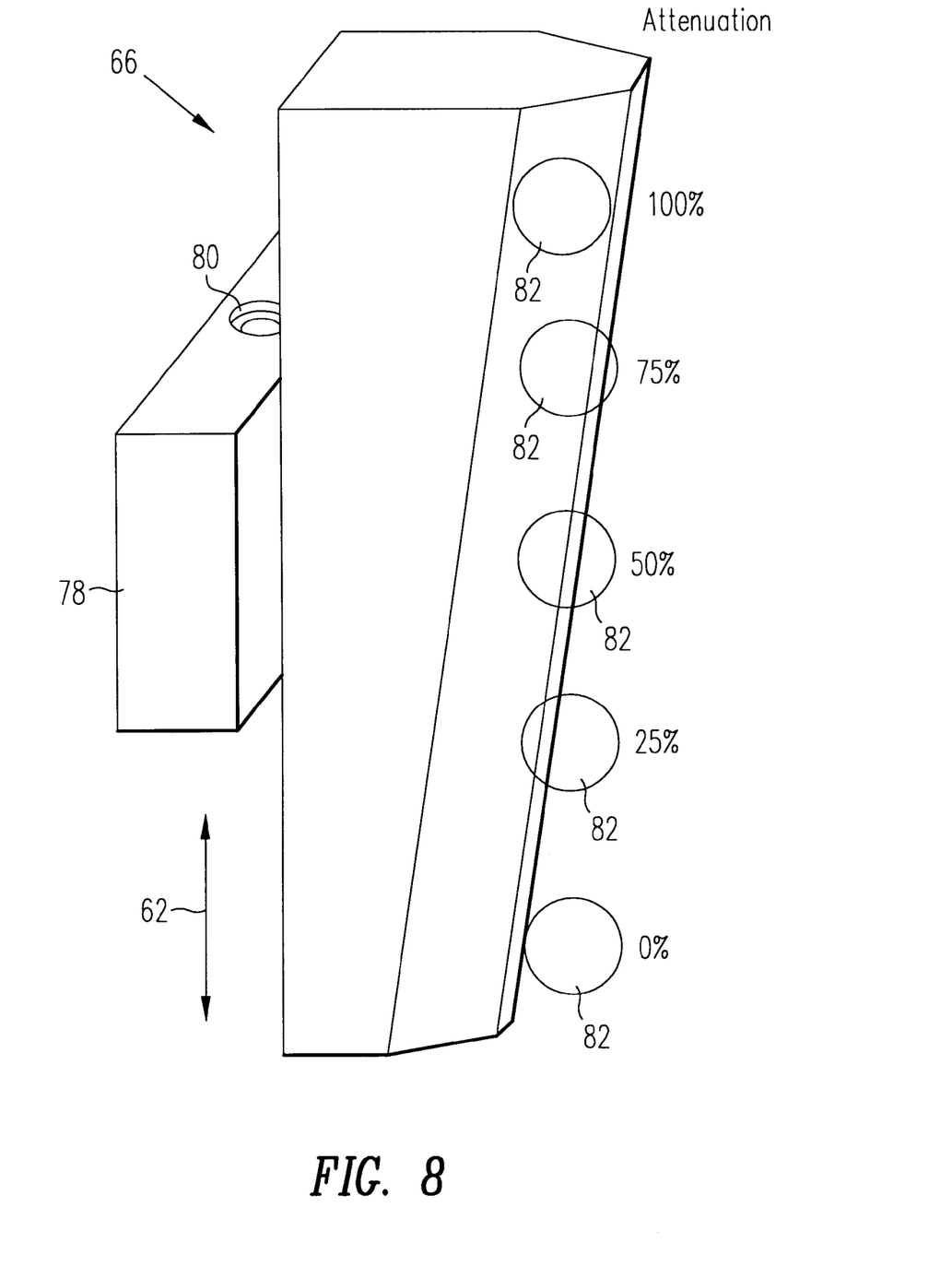
FIG. 8 illustrates the attenuator of FIG. 7A in various positions relative to an impinging light beam showing the various degrees of attenuation.

FIG. 8 identifies the attenuation for various positions of the attenuator 66 with respect to the fixed light output 82 of the fiber. The position of attenuator 66 may be linearly adjusted by a screw to provide from 0% to 100% attenuation.

Figure 9:
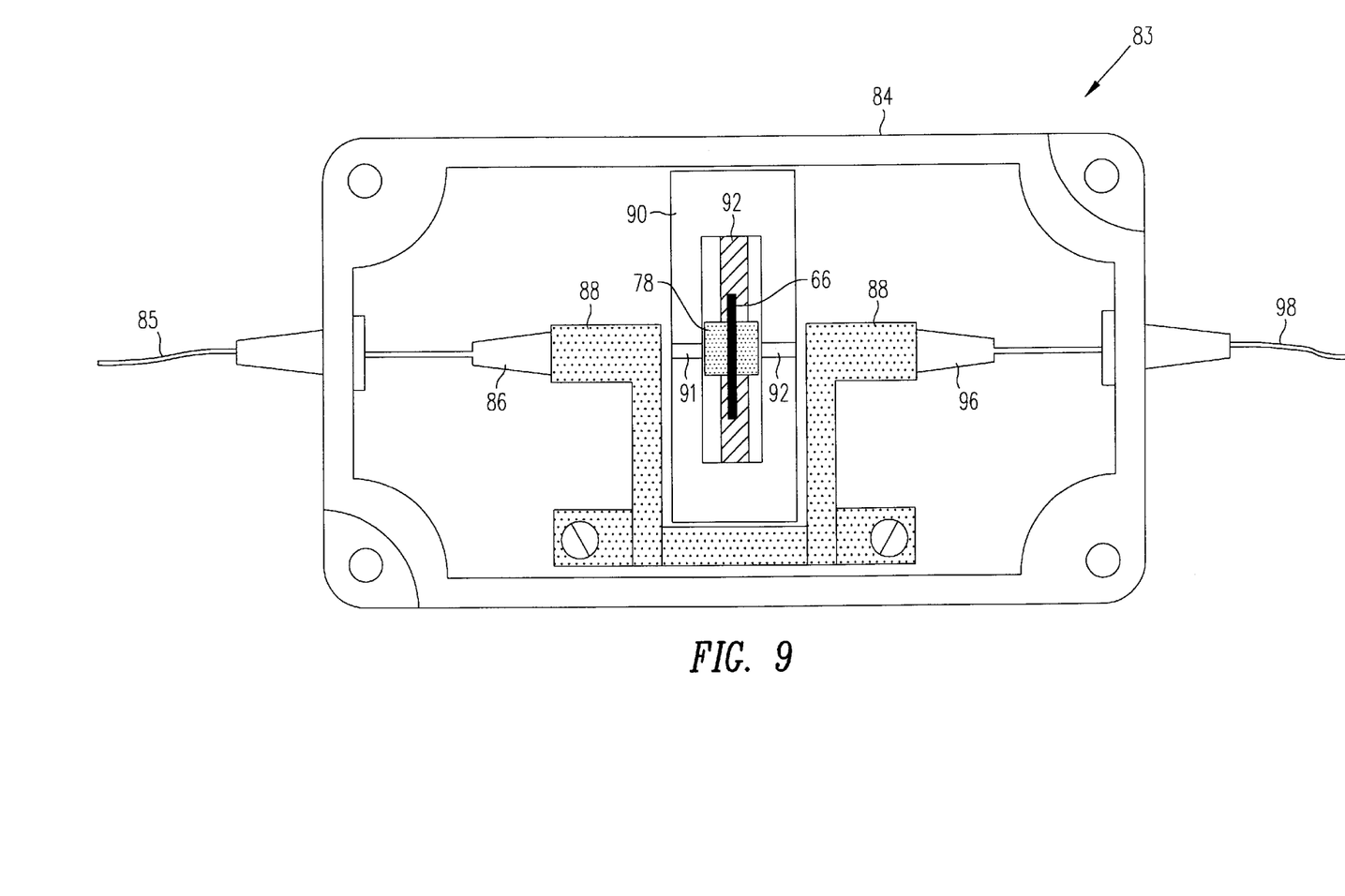
FIG. 9 illustrates one embodiment of the attenuator apparatus including terminations for incoming and outgoing optical fibers as well as an adjustment for the knife-edge attenuator to select the amount of attenuation of the light between the source optical fiber and the receiving optical fiber.

FIG. 9 illustrates a light attenuation unit 83 incorporating the attenuator 66 shown in FIG. 7A. The attenuator unit 83 is provided within a sealed housing 84. The lid of housing 84 has been removed. An input fiber 85 enters through an opening in housing 84 and is terminated at an input to a collimator 86 using well-known techniques. Collimator 86 is supported by an internal structure 88. The output of collimator 86 is a collimated beam.

An internal support 90 retains adjusting screw 92 and, in conjunction with the threaded block 78, restricts the rotational movement of the attenuator 66. Support 90 may be formed of metal or plastic. The adjusting screw 92 extends through threads in block 78 as described with respect to FIG. 7A so that turning screw 92 causes attenuator 66 to move up and down with respect to the support 90 to achieve the desired attenuation of the light beam.

The light beam exiting collimator 86 proceeds through a hole 91 formed in support 90, is selectively attenuated by the edge of attenuator 66, exits through another hole 92 formed in support 90, and enters a receiving collimator 96.

Collimator 96 properly focuses the attenuated beam onto a receiving fiber 98 whose light may be output to a combinor (not shown) for combining the signals from multiple fibers into a single fiber for long distance transmission. The device of FIG. 9 may serve as an attenuator 12, 13, or 14 in FIG. 1, or any attenuator in the demultiplexer 19. In one embodiment, the attenuator is incorporated in a WDM system for a telecommunications network, such as a cable television network.

Figure 10:
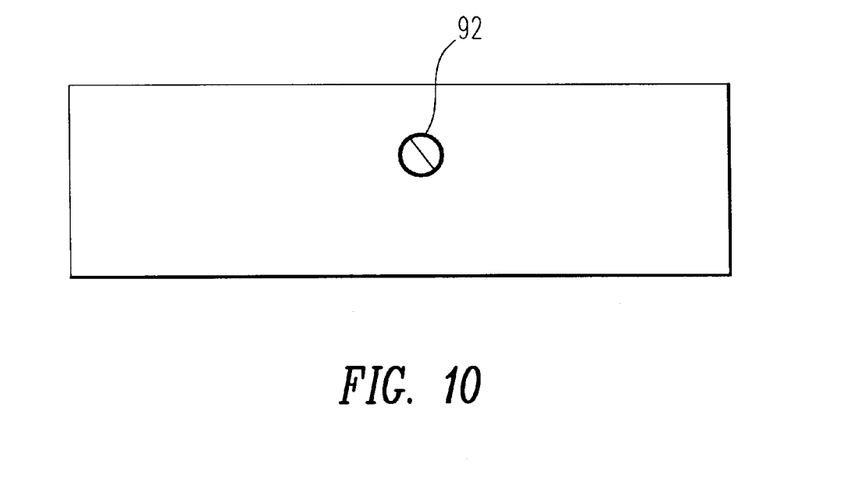
FIG. 10 is a top down view of the device of FIG. 9 showing a screw adjustment for controlling the light attenuation.

FIG. 10 is a top down view of the structure of FIG. 9 showing the top of screw 92 for adjustment.

Figure 11:
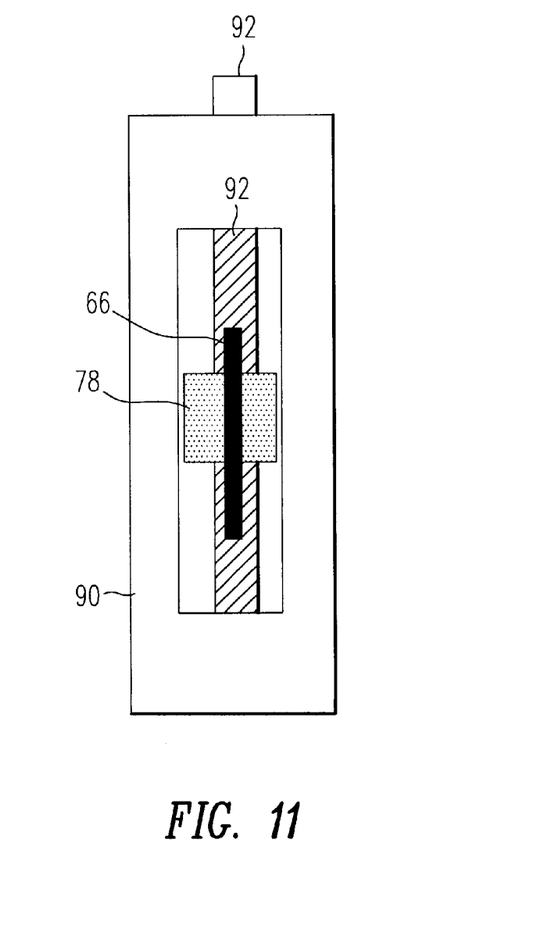
FIG. 11 illustrates the attenuator portion removed from the device of FIG. 9.

FIG. 11 shows the attenuator portion removed from unit 83.

It would be understood that there are many types of controllers for adjusting the position of attenuator 66 with respect to the collimated beam. Such transport means may include a motor operated transport, a piezoelectric transducer, or any other known means. Further, the adjustment of the attenuator may be automatic by using a feedback circuit for sensing the intensity levels of the various optical signals from the various channels and adjusting the attenuators 66 until the light levels of the channels are equal.

The optical signals may be supplied to the attenuator via a laser beam, waveguides, or other transmission paths, rather than optical fibers.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An apparatus comprising:
a light attenuation device comprising:
a light transmitting port;
a light receiving port;
a moveable, completely light opaque structure, said opaque structure having an edge which is variably inserted into an optical path between said light transmitting port and said light receiving port to block a variable amount of light; and
an adjustment mechanism connected to said opaque structure,
wherein said light opaque structure is moveable along a single axis, and wherein said opaque structure has an edge at an acute angle to said axis which variably blocks light between said light transmitting port and said light receiving port as said opaque structure is moved along said axis.

2. The apparatus of claim 1 wherein said light transmitting port receives a first optical fiber, and said light receiving port receives a second optical fiber.

3. The apparatus of claim 1 further comprising a light collimator providing a light output at said light transmitting port and a second collimator providing an input to said light receiving port.

4. The apparatus of claim 1 wherein said edge is beveled so that any light reflected from said opaque structure is not reflected back into an incident light beam from said light transmitting port.

5. The apparatus of claim 1 wherein said adjustment mechanism comprises a screw.

6. The apparatus of claim 5 wherein said opaque structure is connected to a screw thread through which is inserted said screw, such that turning said screw moves said opaque structure along an axis so that said edge is variably inserted into said optical path.

7. The apparatus of claim 6 further comprising a support structure which restricts movement of said opaque structure in directions other than along said axis.

8. The apparatus of claim 1 wherein said light attenuation device is one of a plurality of light attenuation devices, each of said light attenuation devices having a light transmitting port connected to a respective input optical fiber and having a light receiving port connected to a respective output optical fiber, each input optical fiber for transmitting light of a different wavelength, attenuated light received at said light receiving port of each of said light attenuation devices being combined for simultaneous transmission on an optical fiber carrying light signals of different light wavelengths.

9. The apparatus of claim 8 wherein said light attenuator devices form part of a wavelength division multiplexer.

10. A method for attenuating light in a wavelength division multiplexer comprising:
transmitting a plurality of optical signals on optical fibers, each optical signal being within a different range of wavelengths, to a respective light transmitting port;
receiving light at a respective light receiving port from each said respective light transmitting port;
variably inserting an edge of a completely light opaque structure into an optical path between each said respective light transmitting port and each said respective light receiving port to block a variable amount of light;
combining optical signals received at each said respective light receiving port into a multiplexed optical signal; and
applying said multiplexed optical signal to an optical fiber for transmission.

11. The method of claim 10 wherein variably inserting an edge comprises moving said light opaque structure along a single axis, and wherein said opaque structure has an edge at an acute angle to said axis which variably blocks light between a respective light transmitting port and a respective light receiving port as said opaque structure is moved along said axis.

12. An apparatus comprising:
a light attenuation device comprising:
a light transmitting port connected to receive light from a first optical fiber;
a light receiving port connected to couple received light to a second optical fiber;
a moveable, completely light opaque structure, said opaque structure having an edge which is variably inserted into an optical path between said light transmitting port and said light receiving port to block a variable amount of light; and
an adjustment mechanism connected to said opaque structure.

* * * * *